US006817682B1

(12) United States Patent
Wine

(10) Patent No.: US 6,817,682 B1
(45) Date of Patent: Nov. 16, 2004

(54) SKID STEER TRACK

(76) Inventor: Daniel L. Wine, 1160-260th St., Glenwood, WI (US) 54013

( * ) Notice: Subject to any disclaimer, the term of this patent is extended or adjusted under 35 U.S.C. 154(b) by 0 days.

(21) Appl. No.: 10/273,613

(22) Filed: Oct. 18, 2002

(51) Int. Cl.[7] .............................................. B62D 55/20
(52) U.S. Cl. ....................... 305/185; 305/200; 305/202
(58) Field of Search .............................. 305/6, 19, 185, 305/191, 193, 198, 196, 200, 201, 202; 152/220; 180/9.1

(56) References Cited

U.S. PATENT DOCUMENTS

| | | | | |
|---|---|---|---|---|
| 2,283,936 A | * | 5/1942 | Knox | 305/42 |
| 2,330,245 A | * | 9/1943 | Schonitzer et al. | 305/198 |
| 4,099,794 A | * | 7/1978 | Hoffart | 305/113 |
| 4,408,646 A | * | 10/1983 | Forsyth | 152/179 |
| 6,203,127 B1 | * | 3/2001 | Chapman | 305/201 |
| 6,447,077 B1 | * | 9/2002 | Durick et al. | 305/201 |

FOREIGN PATENT DOCUMENTS

DE                3629613 A1  *  3/1988

* cited by examiner

Primary Examiner—Russell D. Stormer
(74) Attorney, Agent, or Firm—Robert A. Elwell

(57) ABSTRACT

A track for in-line tires on a skid steer vehicle, the track includes a continuous loop of links with sidebars and a pin and a barrel, the pin and barrel together forming a hinge between the links and extending between the sidebars. Tire side guides extend upward from the side bars to guide the tires along a pathway over the upward side of the hinges. The opposite side of the hinges engage the ground. The tire side guides can be permanently attached or temporarily fastened to the sidebars at selected positions and moved to other selected positions to convert the track for use with different sized tires, thereby proving a convertible track and a method of converting a track. A system for forming and closing the track as a loop of links is also disclosed.

20 Claims, 11 Drawing Sheets

SKID STEER TRACK

BACKGROUND OF INVENTION

The present invention relates to tracked vehicles and in particular relates to tracks for skid steer vehicles.

Skids steer vehicles are commonly encountered in the construction, landscape, agricultural, or lumber industries. Typically, skid steer vehicles have a pair of in-line tires on each side of the vehicle. To advance, both pairs of the tires are rotated in the same direction; to turn the skid steer vehicle, the tires on one side of the vehicle are rotated in opposition to tires on the opposite side. While such vehicles are quite useful, under some conditions, the tires lack adequate traction with the ground. That is, in mud or upon ice, one or more of these tires lose traction with the ground and dig into the ground or slide sideways. Such performance is unacceptable under work conditions and may even be dangerous. Providing tracks has been an oft considered and sometimes employed alternative.

The available track systems for skid steer vehicles, however, also have some considerable drawbacks. One such system is an entirely rubber track. Rubber tracks are extremely expensive and not particularly durable. Another such system is a "grouser" type track. Grouser tracks may be described as plates, with a short connector on either side of the plate, used to provide a track for the tires of the skid steer. The two short links of the grouser track are not in the plane traveled by the tires but rather displaced upward from the plane traveled by the tires. As such, they generate what might be described as a pair of hinge points on each side of the plates in the grouser type track. The distortion resulting from four hinge points allows considerable and undesirable flexibility between adjacent grouser plates. Again, the grouser track suffers from a high price and limited durability. Both forms of tracks also suffer from a performance issue in which the track twists when not directly in contact with a tire. When traversing over a rock or stump or similar obstacle, the track particularly twists in the ground contact segment between the tires and the skid steer vehicle slides unexpectedly sideways.

It would be highly desirable to provide a less expensive track with better performance characteristics than those currently available from rubber tracks or grouser style tracks.

SUMMARY OF THE INVENTION

In an effort to address the expense and undesirable performance characteristics available from rubber or grouser type tracks, this inventor happened upon the serendipitous discovery that existing commercial chains, in extensive use in alternative industries might be modified and adapted for use as skid steer tracks. In particular, this inventor observed that certain chains, known as drag chains, commonly employed to move bulk materials through conveyors in sawmills, pulp and paper mills and similar industries might be employed, with inventive modifications, as tracks for skid steer vehicles. Such chains typically are pulled by a power sprocket adjacent a discharge of a conveyor. An idler sprocket at the beginning of the conveyor trough typically serves to maintain the drag chain in a desired position with the end of the trough. In conveyor use, side adapters are also often employed to maintain the drag chain in the desired position within the trough. Many, but not all, of the attributes desired for a skid steer vehicle track are present in such drag chains. Notably, such chains are relatively durable, having been developed for continuous use dragging bulk materials through a trough to move materials in a specific direction. Further, the chains are produced in substantial quantity, rather than being a high-priced specialty item. Thus, the basic chain, without the tire side guides and modifications of this invention is relatively inexpensive, Moreover, the single hinge formed between each link of a drag chain extends from one side to the other, rather than being two separate smaller hinges on each side of a grouser plate, and therefore would, in theory, allow less "twist" than a grouser style track or a rubber track.

In a first embodiment, a track for a skid steer vehicle according to the present invention, includes a plurality of links. Each link has a pin, a first and second sidebar extending radially from the pin, and a barrel attached to the opposite ends of the sidebars. The sidebars also include an inset-jog which narrows the space in-between the sidebars to correspond to the shorter barrel length. The barrel is rigidly attached to the sidebars. The pin is also radially locked with respect to the side bars. Assembled as a chain, the pin is captured or encased within the barrel. The pin and barrel together form a hinge between sequential links. Moreover, the hinge defines a tire support surface for a tire of the skid steer vehicle on a first side and a ground engaging support on the second side. Projecting from the sidebars, on the first side, are a pair of tire side guides. The tire side guides defined the edges or lateral boundaries of a guided pathway for the tire of the skid steer vehicle over the tire support of the barrel-pin hinge. Preferably, at least the basic chain (i.e. sidebars, barrel and pin) is formed of hardened steel, for example, heat tempered steel.

In some situations, the ends of the chain may be joined to one another and form a perfect fit, or near perfect fit, for a pair of in-line tire of a skid steer vehicle. This is due to the appropriate track length equaling a multiple of links. In other situations, a spacer link must be employed. In one embodiment of the present invention, the spacer link may be a separable bar with a pin end and a barrel end. The two separable parts of the spacer bars may be joined by a bolt and nut arrangement. In another embodiment of the present invention, the spacer link may include a plurality of apertures or holes so that the correct spacing may be selected from amongst the plurality of apertures. Most preferably, the connector system to close the loop has a short portion of bar at the the barrel and the pin, each of the bars have an aperature, and a connector segments with apertures are used to connect the two bars. A spacer is used to correct for a difference in lateral offset between the pin and barrel. If a plurality of connector segments are available with different lengths, wear can be accommodated.

In another embodiment of the present invention, a plurality of tire sizes may be accommodated by a single chain. This is due to the alternative spacings between the sidebar carried tire side guides provided by the offset-jog. That is, tire side guides carried adjacent to the barrel will be spaced to accommodate relatively narrow tires. Tire side guides carried adjacent the pin will be spaced to accommodate relatively wide tires. Tire side guides carried at the offset-jog will accommodate intermediate width tires.

In still another embodiment of the present invention, a plurality of tire sizes may be accommodated by a single modified chain in an interchangeable manner, by providing a plurality of attachment points at the earlier identified positions along the side bars. This interchangeability is achieved in combination with removable or separable tire side guides which can be interchangeably attached to a selected one of such positions. Preferably, such tire side guides are bolted for attachment to the side bars at desired positions. Most preferably, the attachment system further includes a means for preventing rotation about the attachment bolts. For example, a second bolt might be provided, an interacting flange, either above or below the side bar, or a supplemental pin arrangement.

In yet another embodiment of the present invention, a plurality of tire sizes maybe accommodated by providing tire side guides, with a relatively wide spacing, in combination with a tire side spacer. Alternatively, a variety of tire side spacers may be employed on one or both of the tire side guides to provide many optional tire width spacings.

In still another embodiment of the present invention, attachments for ground interacting or ground engaging accessories maybe provided on the links. In such a manner, a variety of the ground engaging accessories may be removably attached. Preferably, such ground engaging accessories are attached to the side bars. In one variation, where the sidebars carry a plurality of attachment apertures for moveable tire side guides, an un-occupied aperture may be used to attach the accessory. Alternatively, the ground engaging accessories in may be reversibly attached to the hinge, formed from the pin and barrel combination. Depending upon whether the exterior of the hinge moves with either the current link or the adjacent link, the accessory may be engaging the ground in a leading or following manner. In contrast, accessories carried on the side bar are always engaged with the remainder of the link. Alternatively, a dedicated attachment point may be provided for ground engaging accessories. If so, it is preferred that the dedicated attachment for accessories be a vertically oriented aperture (relative to the hinge axis.)

In other embodiments of the current invention, the present invention is a method of converting to a convertible chain by the steps of: providing a chain formed of links according to the appropriable descriptions and altering the spacing between the tire side guides (or tire side guides which spacers) and the center line as defined by mid points of the hinge formed by the barrel and pin combination of two adjoining links.

DETAILED DESCRIPTION

Figure 1:
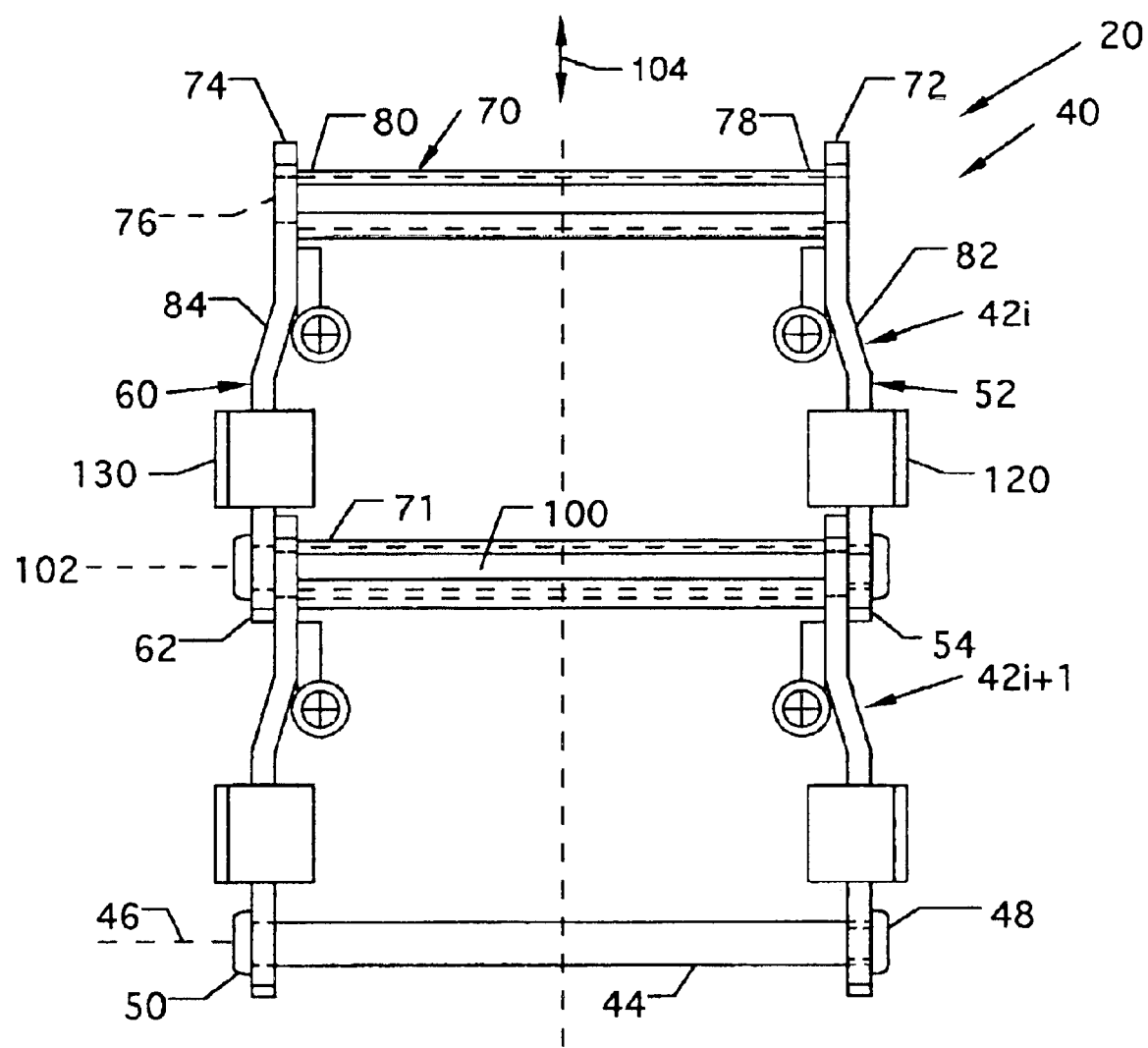
FIG. 1 shows a top view of a segment of chain with sidebars of links modified according to the present invention.
Figure 2:
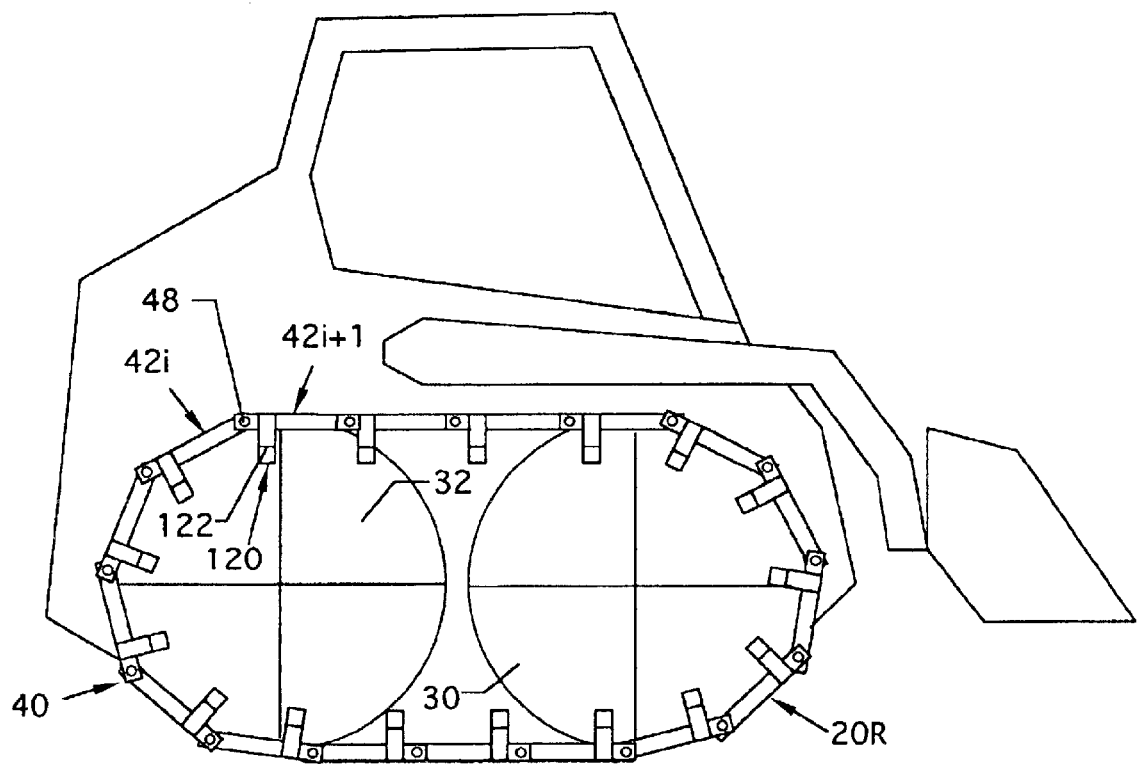
FIG. 2 shows a skid steer vehicle with a track according to the present invention.
Figure 3A:
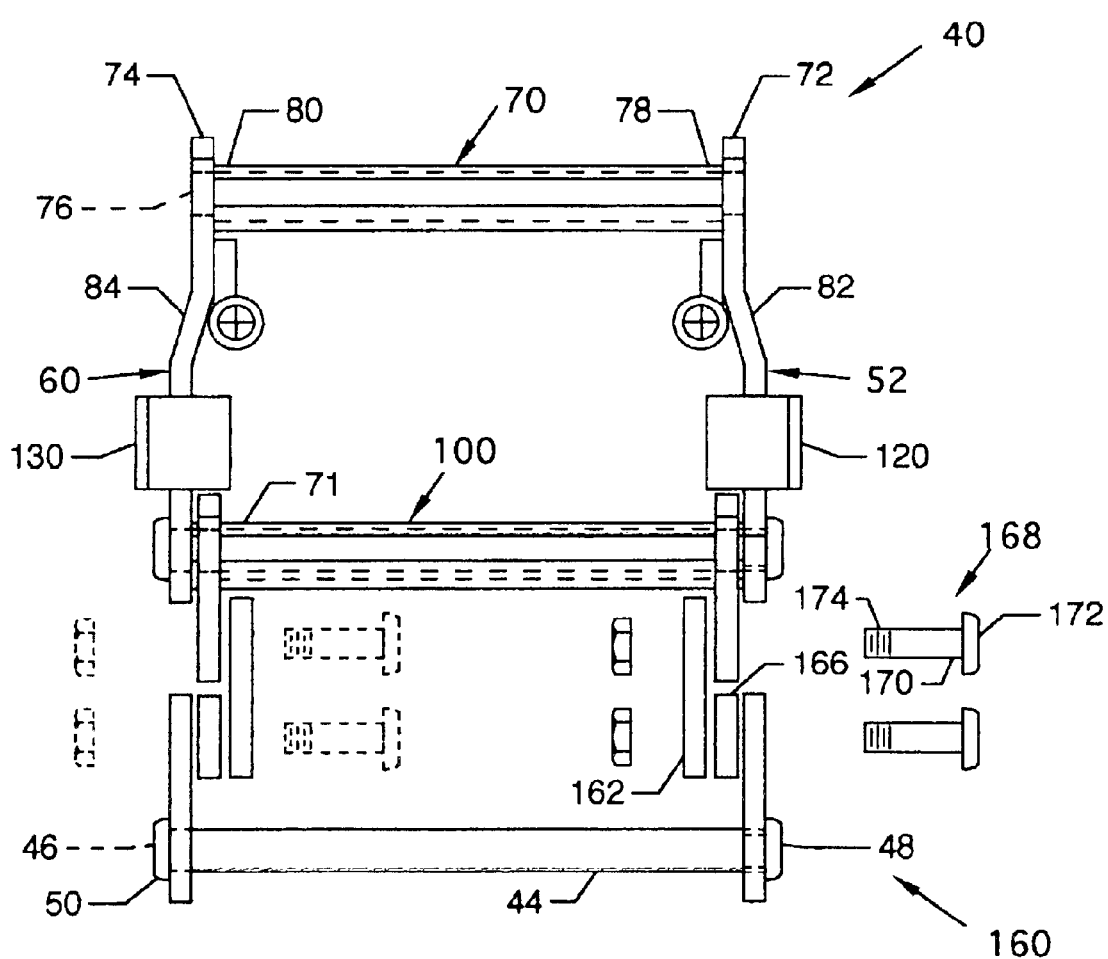
FIG. 3a, shows a spacer bar for joining chain ends
Figure 3B:
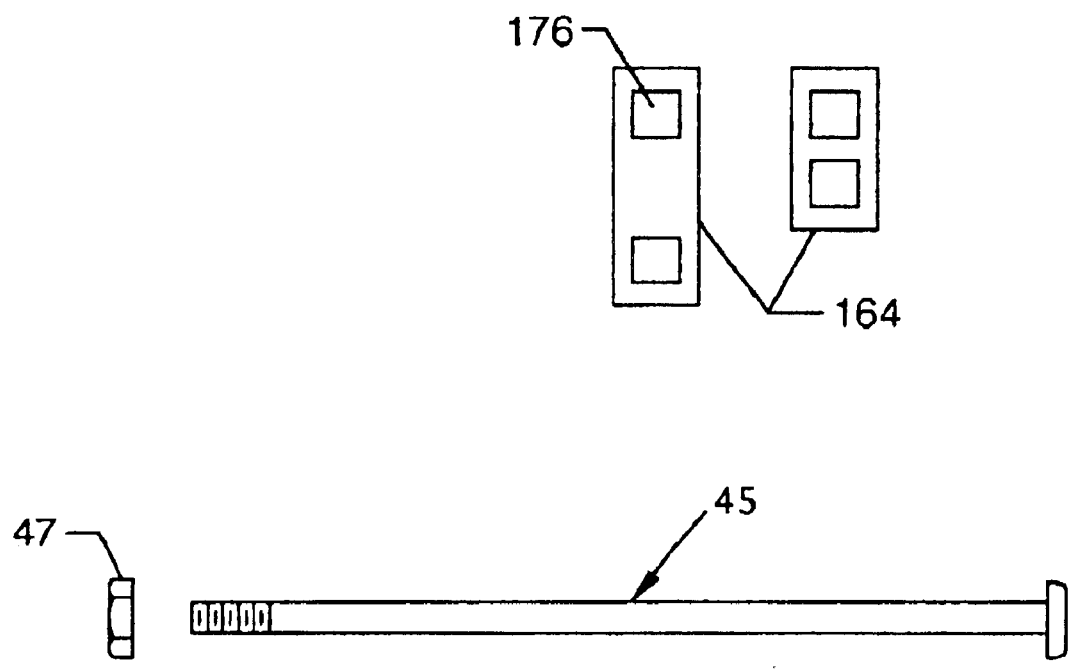
FIG. 3b shows a plurality of alternate spacer bars, each of which is separable, for joining chain ends.
Figure 4:
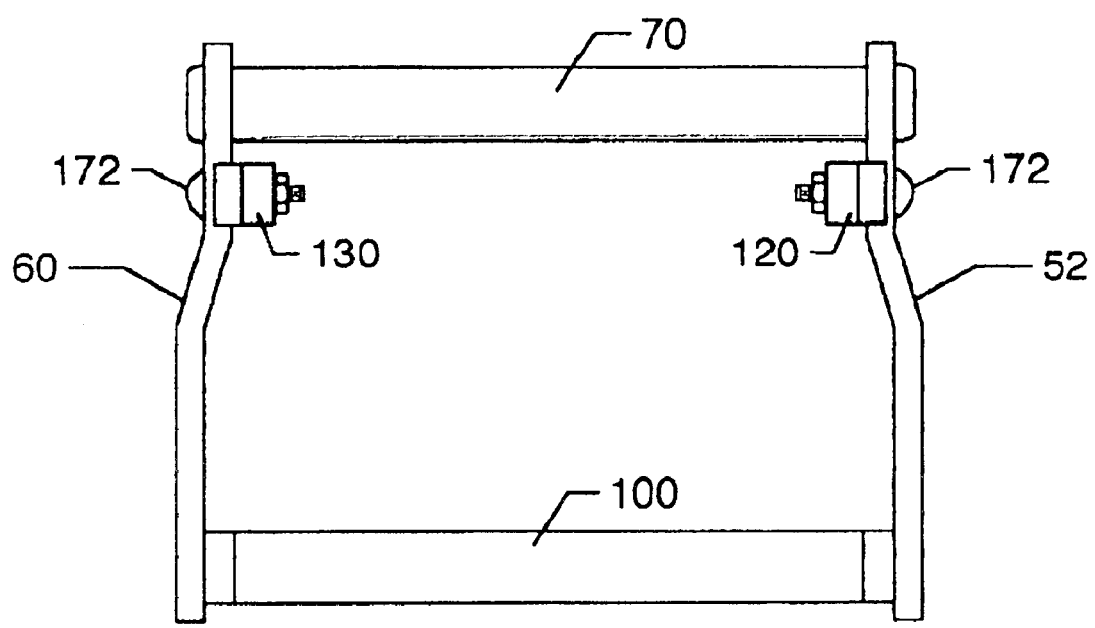
FIG. 4 shows a top view of a segment of chain with sidebars of links modified for narrow tires.
Figure 5:
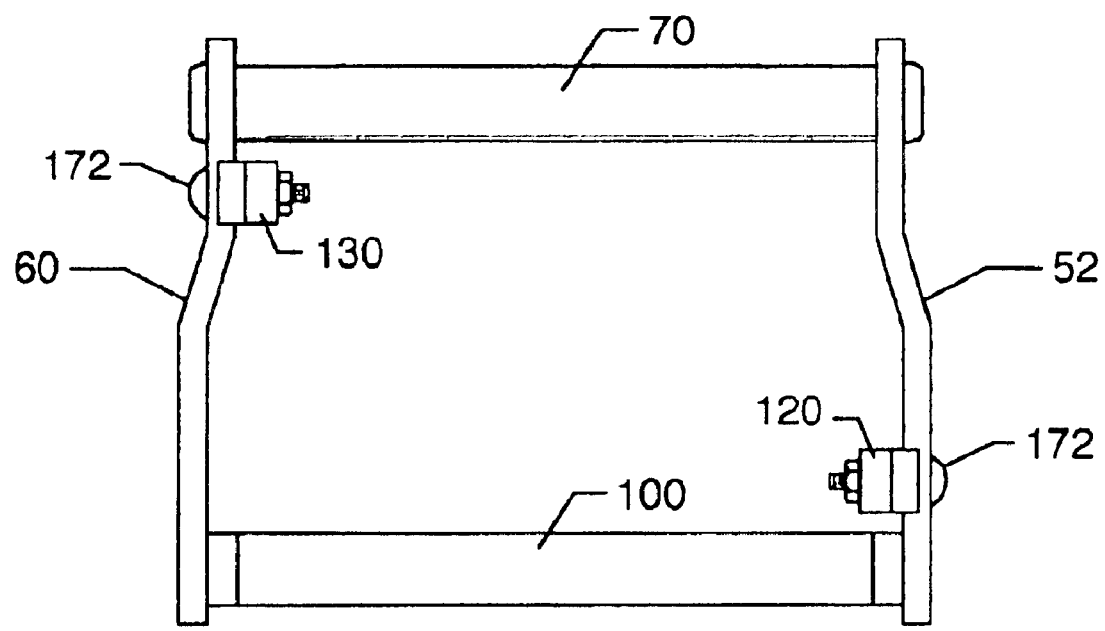
FIG. 5 shows a top view of a segment of chain with sidebars of links modified for intermediate width tires.

In a first embodiment, the present invention is a track, 20 of FIG. 1, for a skid steer vehicle 22. The skid steer vehicle 22, shown in FIG. 2, has fore and aft in-line tires, 24 and 26, on the left side 28 and fore and aft in-line tires 30 and 32 on the right side 34. Preferably, each pair of in-line tires 24 and 26, as well as 30 and 32 respectively, engages a substantially identically arranged track 20. Alternatively, it is possible to arrange the left hand track 20L engaging left-hand tire pair, 24 and 26, in a first orientation, and to arrange the right hand track 20R engaging the right-hand tire pair, 30 and 32, in a second orientation, opposite to the first orientation, as will be clear once the invention has been explained in additional detail below.

The track 20 may be understood as a chain 40 of numerous repeating links 42$i$, 42$i$+1, and so forth, as shown in FIG. 1. Each link 42 has a pin 44 with a pin axis 46, a first pin end 48 and a second pin end 50. A first side bar 52 extents radially outward from adjacent the first pin end 48 of the pin 44. The first side bar 52 has a connecting end 54, which is radially locked relative to the pin 44. A second sidebar 60 extents radially outward from adjacent the second pin end 50 of the pin 44. The second sidebar 60 is radially locked relative to the pin 44. The second sidebar 60 has a connecting end 62. The second sidebar 60, achieves its radial locked relationship with pin 44 due to a longitudinally extending flat interacting with a cooperatively shaped aperture in connecting end 62. A similar arrangement is present at connecting end 54.

A barrel 70 is present at barrel end 72 of sidebar 52 and barrel end 74 of sidebar 60 and is located between these ends 72 and 74 of the sidebars 52 and 60. The barrel 70 has a barrel axis 76, which, when assembled as a chain 40, is shared with the pin axis 46 of an adjacent link. The barrel end 72 of sidebar 52 is permanently attached to the end 78 of barrel 70, as is barrel end 74 of sidebar 60 to other end 80 of barrel 70. The barrel ends project radially outward from the barrel 70. The barrel 70 is not as long as the pin 44 but encases or captures the pin 44 of the adjacent link 42$i$+1. Between the connecting end 54 and the barrel end 72 of side bar 52 is an inset-jog 82 and a complementary inset-jog 84 is present in the second sidebar 60 between the connecting end 72 and the barrel end 74. The inset-jogs 82 and 84 narrow the spacing between the sidebars 52 and 60, such that the barrel 70 is carried spaced apart from and parallel to the pin 44 in an aligned relationship between the first sidebar 52 and the second sidebar 60. The barrel 70 of the link 42$i$ and the pin 44 of the next link 42$i$+1 form a hinge 100 between the adjacent links. The chain 40 may be considered as a sequence of links with hinged connections between the links. Each hinge 100 has a midpoint 102, which is the midpoint of the pin 44 and the barrel 70. The midpoints 102 define a pathway 104 over the hinges 100. That is, a first side of the hinge 100 provides a support surface for supporting, sequentially, individual tires of the pair of in-line tires of the skid steer vehicle. The tire support surface of the hinge and the side of the link and chain facing generally in the same direction as the tire supporting surface may best be understood as being directed upward. The downward or opposite side of the hinge 100 engages the ground surface beneath the tires. The barrel has one flat vertical side 71. The ground surface is also engaged by the sidebars 52 and 60, and in particular by a lower edge of the sidebar. Other ground engaging devices may also be involved as will be explained in greater detail subsequently.

The in-line tires 24 and 26 or 30 and 32 can move along the pathway 104. However, the tires, for example 24 and 26, have an undesirable tendency to stray off the pathway 104. This undesirable tendency is most pronounced when the skid steer vehicle is undergoing a turning operation with one set of in-line tires counter-rotating the other in-line set of tires. To counteract the undesirable tendency to stray off the pathway 104, a guide system to guide the tires along the pathway has been invented, to guide tires, for example tires 24 and 26, along the pathway 104.

In one embodiment, a first tire side guide 120 projects upwardly, i.e. in the tire support direction and away from the ground engaging direction, from the first sidebar 52. A second tire side guide 130 projects upwardly from the second side bar 60. These two tire side guides form a lateral boundary on each side of the pathway 104 over the tire support surfaces of the hinges 100. At the greatest extent of the tire side guides, 120 and 130, is an axial flare 122 and 132, respectively. These axial flares 122 and 132 serve to further guide an approaching tire into alignment between the tire side guides 120 and 130 and on the pathway 104. The axial flares 122 and 132 might be understood as broadening the entrance into the space between the tire side guides 120 and 130 and further protecting the tires and particularly the sidewalls of the tires from puncture or excessive abrasion by the tire side guides 120 and 130. As a tire rolls away from the region under control of the tire side guides 120 and 130, the axial flares 122 and 132 ease the exit of the tire and again protect the tire from tearing or snagging. As the tire passes by, it first rolls into a situation of being temporarily captured between the tire side guides 120 and 130 and upon the pathway 104 and then continues to roll out of control of the tire side guides 120 and 130. However, the adjoining link, which is next encountered by the tire moving along the pathway 104, also has an set of tire side guides 120 and 130, each with an axial flare 122 and 132 and thus control of the tire is handed off to the next link. As the tire continues along the pathway 104, support and guidance is repeatedly provided by the links of the track. Reversal of direction of tire rotation similarly reverses the control back to the earlier encountered tire side guides.

Having thus described the interaction of the tires with the tire support provided by the hinges 100 and the tire side guides 120 and 130, another feature will be explained. Because the sidebars 52 and 60 have a first spaced apart relationship adjacent the pin and a narrower spaced apart adjacent the barrel, two spacings from the center line of the pathway are available for the tire side guides 120 and 130 of this embodiment. An additional intermediate attachment spacing is available at the offset jog of each of the sidebars 52 and 60. While it is preferred that the tire side guides 120 and 130 are laterally opposed to each other, i.e. equally spaced from hinge 100, it is also possible to have one tire sidebar adjacent the pin 44 and the other adjacent the barrel 70.

The tire side guides 120 and 130, in a first embodiment, are welded to the respective side bars 52 and 60. In an alternative embodiment, the tire side guides 120 are removably attached to the sidebars 52 and 60, for example by bolts. In a preferred embodiment, the sidebars 52 and 60 have a plurality of apertures or bolt accepting holes so that the tire sides bars may be selectively attached at a spacing which will allow the skid steer tire size to be coordinated with the track. If the track is later to be used with a different tire size, the spacing between the tire side guides 120 and 130 then may be altered by shifting one or both of these guides to a different attachment aperture.

In yet another embodiment, the tire side guides 120 and 130 are modified by the addition of a spacer 140. The spacer 140, if on the inside edge of the sidebar, narrows the distance across the track to accommodate narrower tires or alternatively, broadens the spacing if placed on the outside of the sidebar.

To install the track of the present invention on a skid steer vehicle, it is preferred that a track be installed on each side of the skid steer (i.e., the track of the present invention is intended to be used as one of a pair of tracks.) The preferred installation may be accomplished by the following steps. First, the pair of tracks, 20R and 20L, are deployed on the ground in a parallel and spaced arrangement with the tire contacting portion of the hinges 100 directed upward. At this point, each track has a beginning and an ending link and the length of each track is roughly equal to or slightly exceeding the circumference of one of the side tires plus double the distance between the axels supporting the tires. The spacing between the tracks should be approximately the same as the spacing of the tires from one side to the other side of the skid steer. Next, the skid steer 22 is maneuvered onto the deployed tracks 20R & 20L by driving onto the tracks from an end of the tracks. Preferably, the tracks of the pair are arranged such that the flat side of barrels of both tracks are directed in the same direction. In performing this step in the installation, the orientation of the barrel flat sides 71 may be selected by the orientation of the skid steer direction relative to the flat sides 71 of the barrels. For example, in an anticipated use of the skid steer where maximum ground engagement is required when the skid steer will be backing up, the barrel flat sides 71 should be directed forward where they engage the ground. In contrast, in an anticipated use of the skid steer where maximum ground engagement is required when the skid steer is pulling forward, the flat sides of the barrels should be directed rearward where they engage the ground. The skid steer, after traversing the ends in the desired direction, continues to roughly a mid-point of the tracks. Next, the leading and trailing ends of each track are lifted over the tires such that the two ends approach being adjacent and aligned with each other. Due to the weight of tracks, it may be helpful and or necessary to provide a compression mechanism to pull the ends closer. A hand winch, pliers, a windlass or similar mechanism may be used to accomplish this pulling step step. Next the ends are joined to form an endless loop of track on each side of the skid steer.

In joining the ends, two distinct approaches are available, depending upon the relationship of the length of track and the size of the skid steer upon which they are being mounted. In a first approach, the length of track and the skid steer are in a nearly ideal relationship. In this approach, a modified pin 45 is used to join the ends. The modified pin 45 has a threaded end which is held in place by a nut 47. The modified pin 45 nearly perfectly substitutes for the original pin 44. The modified pin 45 has a flat which retains it relationship to the sidebar 52 or 60, such that wear between the interior of the barrel 70 and the modified pin 45 occurs across the entire interior of the barrel 70, rather than wear occurring between the much narrower engagement of a pin 45 (or 44) and the side bar (52 or 60.) It will be recognized, however, that eventually wear of the tires and the track will cause the nearly ideal relationship to be lost. In such circumstances, the second approach to joining the ends is encountered.

In the second approach to joining the ends of the tracks, the nearly ideal relationship either is not present to begin with or has occurred as a result of wear. In this situation, a joiner link system 160 is employed. The joiner link system 160 maybe understood as an appropriate substitute for the sidebars, 52 and 60, providing a more appropriate length. Preferably, a plurality 164 of joiners 162 may be supplied to allow selection of a plurality of lengths, and the most appropriate length selected. A joiner-spacer 166 is also supplied to provide lateral spacing. The connectors 168 for the joiners 162 are preferably a square stock or shank 170, with a rounded head 172 on one end and a threaded portion 174 on the other end. In one embodiment, the rounded heads are directed to the outside of the track on each side and nuts are employed on the inside of each track. Alternatively, as shown in ghost outline, the heads may also be situated on the inside and the nuts employed on the outside of the track. Apertures are also provided to accommodate and key to the square stock of the connectors. Preferably, the square stock or shanks of the connectors are ¾ inch steel and the apertures are just slightly greater square holes. Alternatively, a ⅝ inch hole might be used. One of ordinary skill will recognize that the connectors serve to prevent pivoting between the pin and barrel hinge 100 on one side of a joiner 162 and the pin and barrel hinge 70 on the other side of the joiner 162, and thus other known systems to prevent pivoting are within the scope of the joiner link system 160 of the present invention, while providing a plurality of lengths from which to select. Further, one of ordinary skill will recognize that track and tire wear may need to be accommodated more than once over the long life of such systems. It should be further pointed out that operational and manufacturing efficiency results from each link of the track being originally provided with such square apertures in the side bars 52 and 60 as well as joiner 162, and joiner-spacer 166. Should a link break or otherwise require repair or modification or alteration of track length, merely cutting sidebars 52 and 60 allows an expeditious repair, even in the field if so required. Moreover, the provision of such apertures 176 in the sidebars 52 and 60 allows for tire side guides 120 and 130 to mounted or modified in spacing as needed. Further, the apertures 176 not employed for tire side guides or joining remain available for mounting ground engaging accessories.

Figure 6:
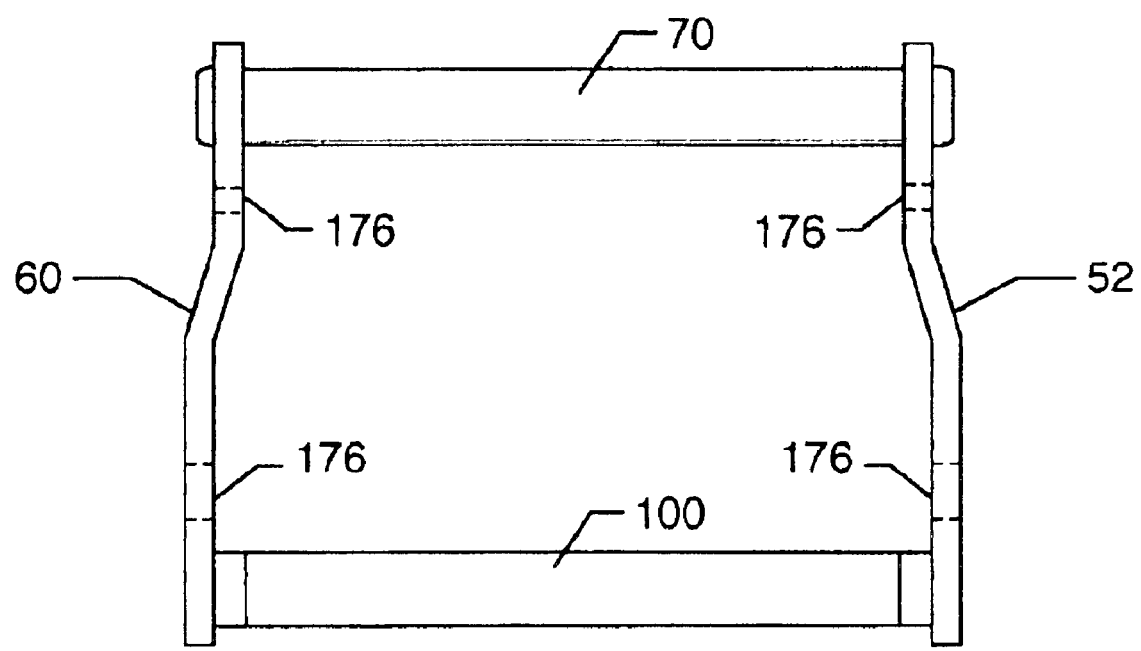
FIG. 6 shows a top view of a segment of chain with sidebars having a plurality of attachment points.
Figure 6B:
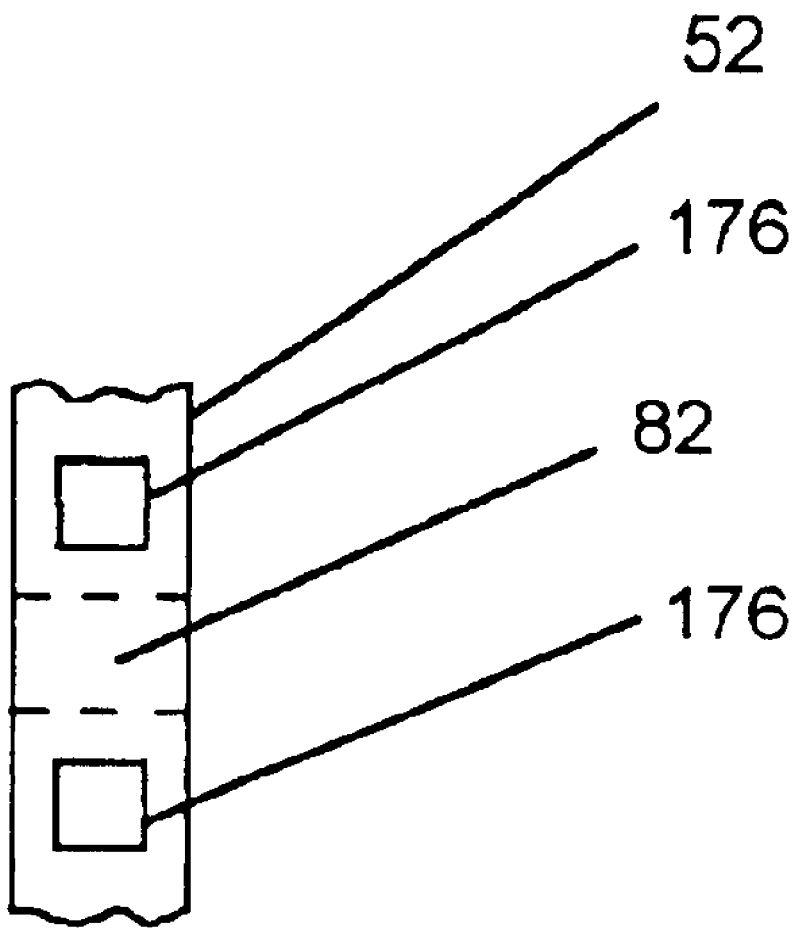
FIG. 6b shows a side view of a portion of a sidebar of FIG. 6.
Figure 7:
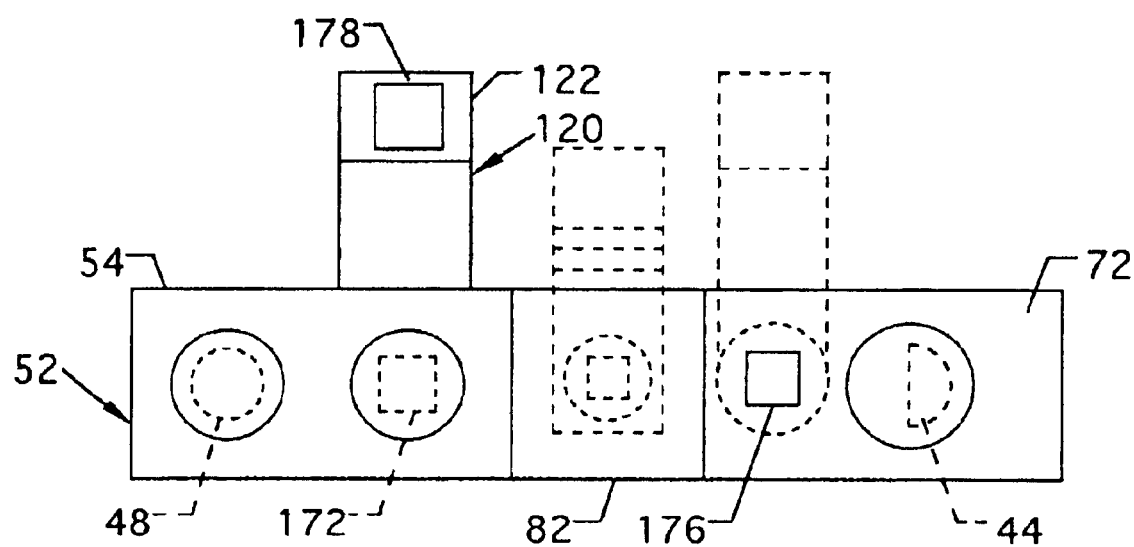
FIG. 7 shows a side view of three alternative removable tire side guides.
Figure 8:
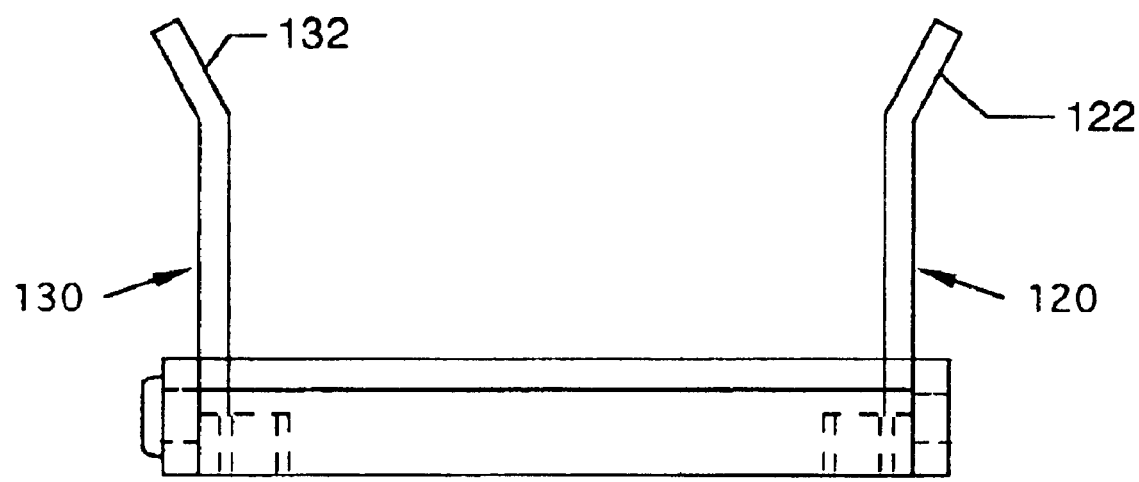
FIG. 8 shows an end view of the embodiment of FIG. 1.
Figure 9:
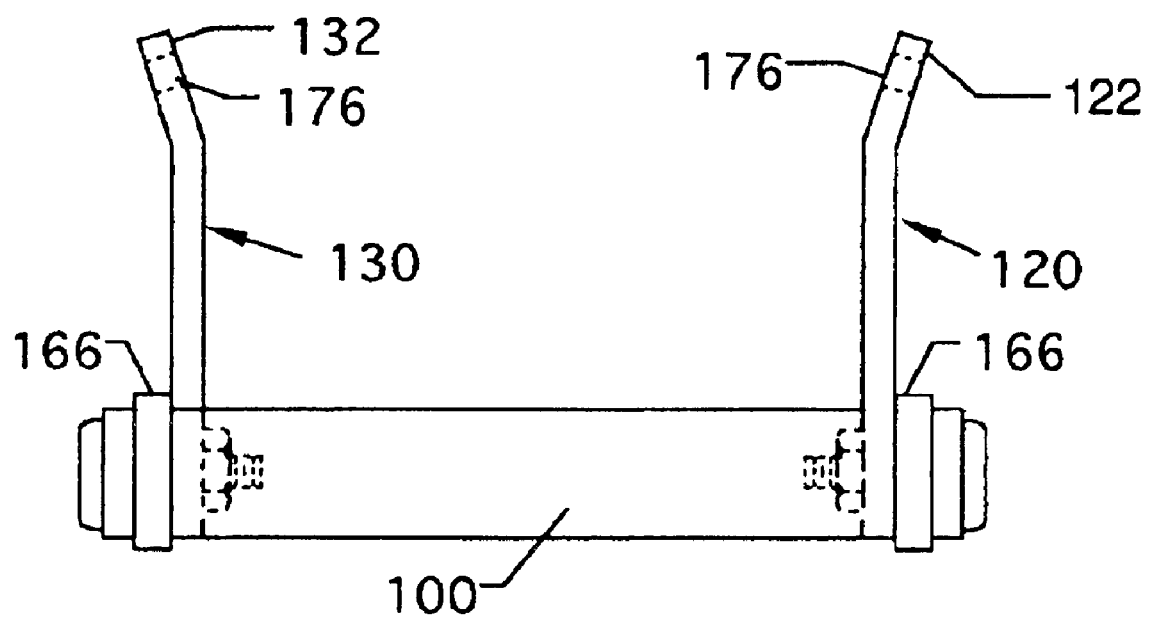
FIG. 9 shows an end view as in FIG. 8 but including a tire spacer between the sidebars and the tire side guides, thereby altering the spacing between the tire side guides.

As shown in FIG. 6b, sidebar 52 has an inset-jog 82, and may have square apertures 176 on either side of the inset-jog 82, such that tire side guides may be selectively attached with square shank bolts.

To remove the tracks, the process is generally reversed, removing a pair of connectors 168 from each track and driving off of the track with the skid steer vehicle. To modify the tracks for a different tire size, in this apertured embodiment, the tire side guides 120 and/or 130 or both are moved to different locations on the sidebars 52 and 60, generally relative to the inset jog 82 or a spacer, such as joiner-spacer 166 is inserted or removed, as appropriate. Optionally, the ground engaging accessories utilize unused apertures. Ground engaging accessories include spikes, flotation plates, vertical plates, cleats, etc. Absent any accessories, the present track is remarkably capable of dislodging any mud through the relatively large openings of the links. As such it is less prone to damaging a skid steer with a track than a comparable grouser-type or rubber track.

Those of ordinary skill will recognized that skid steer vehicles have well known safety concerns associated with them that are oft times associated with guards and interlock mechanisms, and such safety concerns and precautions, although not the subject of this application, should not be disregarded nor disabled in practicing the present invention. Various modifications can be made to the present invention without departing from the spirit of the invention.

I claim:
1. A track for a skid steer vehicle, comprising:
a plurality of links, each of the links having a pin, the pin having a pin axis, a first pin end and a second pin end, a first sidebar extending radially outward from adjacent the first pin end of the pin, a second sidebar extending radially outward from adjacent the second pin end of the pin, the first and second sidebars being radially locked relative to the pin in a substantially spaced apart and parallel relationship, the first sidebar further having an inset-jog directed toward the second sidebar and the second sidebar further having an inset-jog directed toward the first sidebar, a barrel, the barrel having a barrel axis, a first barrel end and a second barrel end, the first barrel end rigidly secured to the first sidebar radially outward from the inset-jog and the second barrel end rigidly secured to the second sidebar radially outward from the inset-jog, such that the barrel is carried spaced apart from and parallel to the pin in an aligned relationship between the first sidebar extending from the pin and the second sidebar extending from the pin, and the barrel of a link capturing a pin of a sequential link between the first and second sidebars of the sequential link to define a barrel-pin hinge between the link and the sequential link, the barrel-pin hinge defining, on a first side, a tire-support for a tire of the skid steer vehicle and defining on an opposite side a ground-engaging support; and
a first tire side guide projecting from the first sidebar on the first side of each link and a second tire side guide projecting from the second sidebar on the first side of each link, the first and second tire guides together defining boundaries of a guided pathway for the tire of the skid steer vehicle over the tire-support of the barrel-pin hinge.

2. The track of claim 1 and wherein the links are joined to form a continuous track such that the tire of the skid steer vehicle is sequentially guided over all of the barrel-pin hinges and then sequentially re-encounters all of the barrel-pin hinges.

3. The track of claim 2 and wherein a spacer-link is encountered, the spacer-link having a smaller spaced apart relationship between the pin and the barrel of the spacer-link than the spaced apart relationship between the pin and barrel of the link.

4. The track of claim 3 and wherein the first and second spacer-link sidebars each have a plurality of apertures to connect to a pin, the plurality providing a plurality of selectable spacings between barrel and pin of the spacer-link.

5. The track of claim 1 and wherein the sidebars, pin and barrel are formed of hardened steel.

6. The track of claim 1 and wherein the first tire side guide has an outward axial flare.

7. The track of claim 1 and wherein the second tire side guide has an outward axial flare.

8. The track of claim 1 and wherein the first tire side guide has an outward axial flare, the outward axial flare of the first tire side guide being spaced apart from the tire-support of the link, and the second tire side guide has an outward axial flare, the outward axial of the second tire side guide being spaced apart from the tire-support of the link.

9. The track of claim 1 and wherein the tire side guides are equally spaced from the pin.

10. The track of claim 1 and wherein the tire side guide of the first sidebar is positioned between the pin and the offset-jog.

11. The track of claim 1 and wherein the tire side guide of the first sidebar is positioned between the offset-jog and the barrel.

12. The track of claim 1 and wherein the tire side guides are permanently attached to the sidebars.

13. The track of claim 1 and wherein the tire side guides are separable from the sidebars.

14. The track of claim 13 and wherein the sidebars have a plurality of attachment positions for the tire side guides, such that the tire side guides may be attached to a selected one of the plurality of attachment positions to facilitate use with different tire sizes.

15. The track of claim 1 and wherein the barrel of the track is characterized by a flat surface on the barrel directed away from the pin of the link.

16. The track of claim 1 wherein the track is one of a pair of tracks are arranged to sequentially engage the in-line tires in the same sequence.

17. The track of claim 1 and wherein the track has a centerline extending through a midpoint of each hinge, the sum of the spacing from the centerline to the tire side guide on the first sidebar and the spacing from the centerline to the tire side guide on the second side bar determining the tire size which the track is adapted to accommodate.

18. A track system, suitable for use on a skid steer vehicle, the track system being convertible from a first size tire to a second size tire, the second size tire being distinct from the first size tire, the system comprising:

a chain, the chain encircling a pair of in-line tires on a side of the skid steer vehicle, the chain comprising a plurality of sequentially hinged links, each of the links having a pin, the pin having a pin axis, a first pin end and a second pin end, a first sidebar extending radially outward from adjacent the first pin end of the pin, a second sidebar extending radially outward from adjacent the second pin end of the pin, the first and second sidebars being radially locked relative to the pin in a substantially spaced apart and parallel relationship, the first sidebar further having an inset-jog directed toward the second sidebar and the second sidebar further having an inset-jog directed toward the first sidebar, a barrel, the barrel having a barrel axis, a first barrel end and a second barrel end, the first barrel end rigidly secured to the first sidebar radially outward from the inset-jog and the second barrel end rigidly secured to the second sidebar radially outward from the inset-jog, such that the barrel is carried spaced apart from and parallel to the pin in an aligned relationship between the first sidebar extending from the pin and the second sidebar extending from the pin, and the barrel of a link encasing a pin of a sequential link between the first and second sidebars of the sequential link to define a barrel-pin hinge between the link and the sequential link, the barrel-pin hinge defining, on a first side, a tire-support for a tire of the skid steer vehicle and defining on an opposite side a ground-engaging support and further defining a center-line of the track through the midpoint of the hinge; and a first tire side guide separably attachable to the first sidebar to project from the first sidebar on the first side of each link with a first separation from the centerline of the track and alternatively separately attachable to a different attachment position with a different spacing from the centerline of the track to provide for a different tire size and a second tire side guide projecting from the second sidebar on the first side of each link, the first and second tire guides together defining a guided pathway for the tire of the skid steer vehicle over the tire-support of the barrel-pin hinge.

19. The convertible track system of claim 18 and wherein the second side bar includes a second separable attachment position for a second tire guide.

20. A method of converting a convertible skid steer track chain, comprising the steps of:

providing a chain and separable tire side guides according to claim 14; and, altering the centerline to tire side guide spacing of the track chain.

* * * * *